(12) United States Patent
Goldovsky et al.

(10) Patent No.: US 6,173,304 B1
(45) Date of Patent: Jan. 9, 2001

(54) JOINT OPTIMIZATION OF MODIFIED-BOOTH ENCODER AND PARTIAL PRODUCT GENERATOR

(75) Inventors: Alexander Goldovsky, Philadelphia; Ravi Kumar Kolagotla, Lansdale, both of PA (US)

(73) Assignee: Lucent Technologies, Inc., Murray Hill, NJ (US)

( * ) Notice: Under 35 U.S.C. 154(b), the term of this patent shall be extended for 0 days.

(21) Appl. No.: 09/137,390

(22) Filed: Aug. 20, 1998

(51) Int. Cl.[7] ....................................................... G06F 7/50
(52) U.S. Cl. ............................................................... 708/630
(58) Field of Search .................................... 708/630, 628, 708/629, 631, 632

(56) References Cited

U.S. PATENT DOCUMENTS

| | | | |
|---|---|---|---|
| 5,325,321 | * | 6/1994 | Ishida .................................. 708/630 |
| 5,485,413 | * | 1/1996 | Kuboniwa ........................... 708/630 |
| 5,506,799 | * | 4/1996 | Nakao .................................. 708/628 |
| 5,748,517 | * | 5/1998 | Miyoshi et al. ..................... 708/630 |
| 5,870,322 | * | 2/1999 | Kim ..................................... 708/628 |

* cited by examiner

Primary Examiner—David H. Malzahn
(74) Attorney, Agent, or Firm—Stroock & Stroock & Lavan LLP

(57) ABSTRACT

A multiplier contains an array of partial product generators, at least one new modified-Booth encoder. Corresponding to each new modified-Booth encoder, the partial product generator array includes a new adder cell. The partial product generator array receives inputs Y0 . . . YN with the Y0 receiving partial product generator being a new partial product generator for generating a partial product PP*(0,j). The new modified-Booth encoder receives multiplier bits and a multiplicand input Y0, and generates control signals and a carry in signal. The new adder cell is connected to the new modified-Booth encoder, the Y0 receiving new partial product generator and the (j−2) row Y2 receiving partial product generator and generates a partial product and an intermediate carry out signal so as to reduce the number of gate delay stages in the critical path of the multiplier.

28 Claims, 6 Drawing Sheets

| MULTIPLIER BITS | | | OPERATION REQUIRED | ENCODER OUTPUT |
|---|---|---|---|---|
| $x_{j+1}$ | $x_j$ | $x_{j-1}$ | | |
| 0 | 0 | 0 | $PP_j \leftarrow PP_{j-2}/4$ | 0 |
| 0 | 0 | 1 | $PP_j \leftarrow PP_{j-2}/4+Y$ | Y |
| 0 | 1 | 0 | $PP_j \leftarrow PP_{j-2}/4+Y$ | Y |
| 0 | 1 | 1 | $PP_j \leftarrow PP_{j-2}/4+2Y$ | 2Y |
| 1 | 0 | 0 | $PP_j \leftarrow PP_{j-2}/4-2Y$ | -2Y |
| 1 | 0 | 1 | $PP_j \leftarrow PP_{j-2}/4-Y$ | -Y |
| 1 | 1 | 0 | $PP_j \leftarrow PP_{j-2}/4-Y$ | -Y |
| 1 | 1 | 1 | $PP_j \leftarrow PP_{j-2}/4$ | 0 |

FIG. 4
(PRIOR ART)

| MULTIPLIER BITS | | | ENCODER OUTPUT | ENCODED SIGNALS | | | |
|---|---|---|---|---|---|---|---|
| $x_{j+1}$ | $x_j$ | $x_{j-1}$ | | POS | TWO | ONE | $C_{in}$ |
| 0 | 0 | 0 | 0 | 1 | 0 | 0 | 0 |
| 0 | 0 | 1 | +1 | 1 | 0 | 1 | 0 |
| 0 | 1 | 0 | +1 | 1 | 0 | 1 | 0 |
| 0 | 1 | 1 | +2 | 1 | 1 | 0 | 0 |
| 1 | 0 | 0 | −2 | 0 | 1 | 0 | 1 |
| 1 | 0 | 1 | −1 | 0 | 0 | 1 | 1 |
| 1 | 1 | 0 | −1 | 0 | 0 | 1 | 1 |
| 1 | 1 | 1 | 0 | 0 | 0 | 0 | 0 |

FIG. 6

| MULTIPLIER BITS | | | ENCODER OUTPUT | ENCODED SIGNALS | | | |
|---|---|---|---|---|---|---|---|
| $x_{j+1}$ | $x_j$ | $x_{j-1}$ | | POS | ONE | TWO | CO |
| 0 | 0 | 0 | 0 | 1 | 0 | 0 | 0 |
| 0 | 0 | 1 | +1 | 1 | 1 | 0 | 0 |
| 0 | 1 | 0 | +1 | 1 | 1 | 0 | 0 |
| 0 | 1 | 1 | +2 | 1 | 0 | 1 | 0 |
| 1 | 0 | 0 | −2 | 0 | 0 | 1 | 1 |
| 1 | 0 | 1 | −1 | 0 | 1 | 0 | $\overline{y0}$ |
| 1 | 1 | 0 | −1 | 0 | 1 | 0 | $\overline{y0}$ |
| 1 | 1 | 1 | 0 | 0 | 0 | 0 | 0 |

JOINT OPTIMIZATION OF MODIFIED-BOOTH ENCODER AND PARTIAL PRODUCT GENERATOR

FIELD OF THE INVENTION

This invention relates generally to the field of encoder and partial product generator circuits in a Booth-MacSorley ("modified-Booth") encoded multiplier, and specifically to a process of optimizing the modified-Booth multiplier array to improve the overall speed of the multiplier.

BACKGROUND OF INVENTION

Multipliers are used in many digital signal processing operations, such as correlations, convolution, filtering and frequency analysis, to perform multiplications. The most basic form of multiplication consists of forming the product of two positive binary numbers. This can be accomplished through the traditional technique of successive additions and shifts in which each addition is conditional on one of the multiplier bits. Thus, the multiplication process may be viewed as consisting of the following two steps:

1. Evaluation of partial products.
2. Accumulation of the shifted partial products.

It should be noted that binary multiplication is equivalent to a logical AND operation. Thus, evaluation of partial products consists of the logical ANDing of the multiplicand and the relevant multiplier bits. Each column of partial products must then be added and, if necessary, any carry values passed to the next column. There are a number of techniques that may be used to perform multiplication.

One such technique is the Radix-n Multiplication system. A Radix-2 system computes the partial products by observing one bit of the multiplicand at a time. Higher radix multipliers can be designed to reduce the number of adders and hence the delay required to compute the partial sums. The best known method is the Booth's algorithm which is a Radix-4 multiplication scheme. Booth's algorithm for a signed binary multiplication technique, as modified by MacSorley, is widely used to design fast multipliers in computer hardware. Reference is made to FIG. 2 which describes the operations required by the modified-Booth algorithm as known in the art.

A multiplier implemented in VLSI typically contains a linear array of modified-Booth encoders, and a quadratic array of partial product generators. Reference is now made to FIG. 1 which depicts a typical implementation of an array generally indicated as 1 in a modified-Booth multiplier. Modified-Booth array 1 includes a modified-Booth encoder 10 which receives and encodes the multiplier input information 23 and includes an array of partial product generators generally referred to at 17. Multiplier input information 23 entering modified-Booth encoder 10 includes multiplier bits 21. Multiplicand inputs Y0–Yn are applied to partial product generator array 17. After encoding multiplier input information 23, modified-Booth encoder 10 sends information to the linear array of partial product generators generally indicated as 17.

In a typical implementation of modified-Booth encoder array 1, multiplier bits 21, represented in FIG. 1 as X(j−1, j, j+1), get converted by modified-Booth encoder 10 to form "n" control signals 24, where "n" represents a number between 3 and 5. In a typical prior art design, there are n=3 control signals 24. Reference is now made to FIG. 4 which depicts the truth table for modified-Booth encoder 10 as known in the art. Control signals 24 are represented in FIG. 4 by column headings POS (Positive), TWO and ONE.

Partial product generators 17 decode the information received from modified-Booth encoder 10 and multiplicand inputs 170 to generate the appropriate partial product bits. Partial product generators 17 represent only a part of the entire partial product generator array of the multiplier. Partial product generators 17 as known in the prior art and as depicted in FIG. 1 include a first partial product generator 11, a second partial product generator 12, a third partial product generator 13, a fourth partial product generator 14, a fifth partial product generator 15 and a sixth partial product generator 16. First partial product generator 11, second partial product generator 12 and third partial product generator 13 represent the first three partial product generators to the left of the modified-Booth encoder in the $j^{th}$ row of modified-Booth encoder. Fourth partial product generator 14, Fifth partial product generator 15 and Sixth partial product generator 16 represent the fourth, fifth and sixth partial product generators to the left of the modified-Booth encoder in the $j-2^{nd}$ row of modified-Booth encoder. Control signals 24, converted from multiplier bits 21, X(j−1,j,j+1), get applied to the corresponding $j^{th}$ row of partial product generators 17. Additionally, input Y0 is applied to first partial product generator 11, input Y1 is applied to second partial product generator 12, input Y2 is applied to third partial product generator 13 and fourth partial product generator 14, input Y3 is applied to fifth partial product generator 15 and input Y4 is applied to sixth partial product generator 16.

Subsequently, the output of the partial product generator in the first column of the $j^{th}$ row (represented as PP(0,j) 28 in FIG. 1) gets added to the output of the partial product generator in the third column of the $j-2^{nd}$ row (represented by PP(2,j−2) 27 in FIG. 1). Thus, referring again to FIG. 1, the output of first partial product generator 11, Y0 receiving partial product 28, gets added to the output of fourth partial product generator 14, Y2 receiving partial product 27 by the full adder 30. Additionally, the carry in output signal 29 ($C_{in}$) of modified-Booth encoder 10 is also used as a carry in to full adder 30 to get a resultant intermediate partial product PP 31 and an intermediate carry out $C_{out}$ 32. This entire operation is depicted inside box A of FIG. 1.

Reference is now made to FIG. 3 which is a digital circuit diagram representation of second partial product generator 12 as known in the prior art. Input $ZO_i$ is provided by first partial product generator 11 to second partial product generator 12. Output $ZI_i$ is provided by second partial product generator 12 to the next partial product generator in the sequence, in this case, third partial product generator 13.

In the prior art implementation of modified-Booth algorithm, carry in output signal $C_{in}$ 29 of modified-Booth encoder 10 can be represented by the following equation as known in the art (see also FIG. 4):

$$C_{in} = X_{j+1}(\overline{X_j} + \overline{X_{j-1}})$$

Expressing $C_{in}$ in POS, ONE, TWO terms as illustrated in FIG. 4 results in the following equation:

$$C_{in} = \overline{POS} \cdot (ONE + TWO) \quad (1)$$

Y0 receiving partial product 28 in an inverted representation can be expressed in the prior art by the following equation:

$$\overline{PP_{j,0}} = ((POS \oplus Y0) \cdot ONE) + (POS \cdot TWO) + (\overline{ONE \cdot TWO}) \quad (2)$$

The output of full adder 30 is a summation of carry in output signal $C_{in}$ 29, Y0 receiving partial product PP(0,j) 28 and Y2 receiving partial product PP(2,j−2) 27. This summation results in intermediate partial product PP 31 and intermediate carry out $C_{out}$ 32. Intermediate partial product PP 31 can be represented by the following equation:

$$PP = P_{j,0} \oplus PP_{j-2,2} \oplus C_{in} \qquad (3)$$

Intermediate carry out $C_{out}$ 32 can be represented by the following equation:

$$C_{out} = (PP_{j,0} \oplus PP_{j-2,2}) \cdot C_{in} + (PP_{j,0} \oplus PP_{j-2,2}) \cdot PP_{j,0} \qquad (4)$$

By combining equation (1) and (2) it can be shown that the intermediate term for generation of intermediate partial product PP 31 is simplified as follows:

$$C_{in} \oplus PP_{j,0} = Y0 \cdot \text{ONE} \qquad (5)$$

The critical path through modified-Booth encoder array 1 begins with multiplier bits 21 input into modified-Booth encoder 10, followed by "n" control signals 24 output by modified-Booth encoder 10, followed by Y0 receiving partial product 28 output from first partial product generator 11, followed by full adder 30, followed by the output of full adder 30, the output being in terms of intermediate partial product 31 or intermediate carry out 32. This critical path is the slowest path 20, as depicted in FIG. 1, in the process and hence is the step which must be modified in order to speed up the process. Referring once again to FIG. 1 it takes two gate delay stages to generate control signals 24 from modified-Booth encoder 10, another two gate delay stages to generate Y0 receiving partial product PP(0,j) 28 and four gate delay stages to get intermediate partial product PP 31 or intermediate carry out $C_{out}$ 32 signals. Thus, it takes a total of eight gate delay stages to travel through slowest path 20. With the constant demand for faster speeds in digital signal processing operations, there is a appreciable need for a faster multiplier that can reduce the delay in critical path 20. Thus, it is desirable to provide for a optimized modified-Booth multiplier array to improve the overall speed of the multiplier.

SUMMARY OF THE INVENTION

The present invention is directed at overcoming the shortcomings of the prior art. Generally speaking, in accordance with the present invention, a multiplier comprises an array of partial product generators and at least one new modified-Booth encoder. Corresponding to each new modified-Booth encoder, the partial product generator array includes a new adder cell. The array receives inputs Y0 . . . YN with the Y0-receiving partial product generator being a new partial product generator for generating a partial product PP*(0,j). The new modified-Booth encoder receives input Y0 and multiplier bits and generates control signals and a carry in signal. The new adder cell is connected to the new modified-Booth encoder, the new Y0 receiving partial product generator and the (j−2) row Y2 receiving partial product generator and generates a partial product and an intermediate carry out signal so as to reduce the number of gate delay stages in the critical path of the multiplier.

Other objects and features of the present invention will become apparent from the following detailed description, considered in conjunction with the accompanying drawing figures. It is to be understood, however, that the drawings, which are not to scale, are designed solely for the purpose of illustration and not as a definition of the limits of the invention, for which reference should be made to the appended claims.

BRIEF DESCRIPTION OF THE DRAWINGS

In the drawing figures, which are not to scale, and which are merely illustrative, and wherein like reference numerals depict like elements throughout the several views:

FIG. 4 is a truth table of a Modified-Booth algorithm with a partial product generator constructed in accordance with the prior art;

FIG. 6 is a truth table of a Modified-Booth algorithm in accordance with the present invention;

DETAILED DESCRIPTION OF THE PREFERRED EMBODIMENTS

Figure 5:
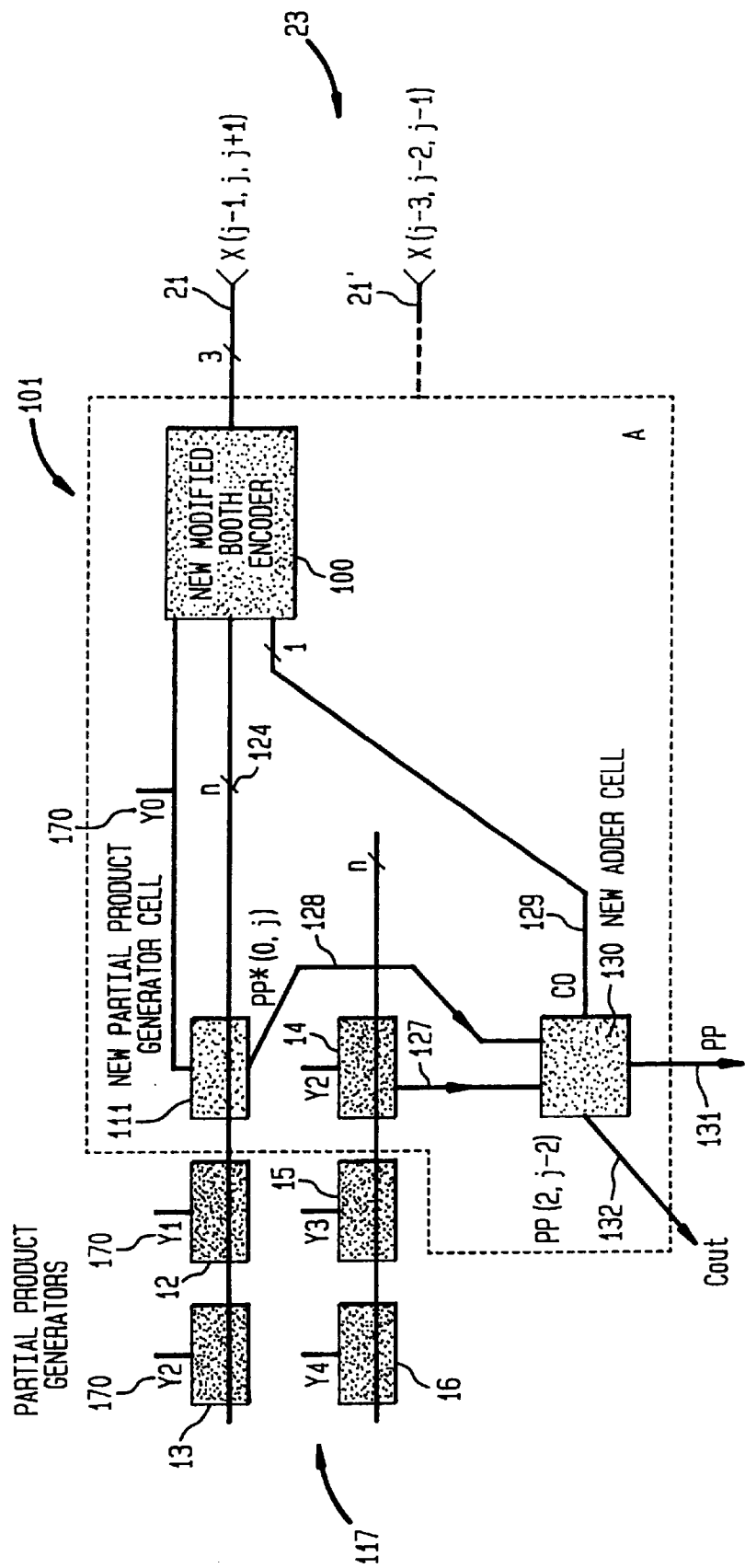
FIG. 5 is a schematic diagram of an implementation of the array in a Modified-Booth multiplier constructed in accordance with the present invention.

Reference is first made to FIG. 5, which depicts an implementation of an array 101 in a new modified-Booth multiplier constructed in accordance with the present invention. New modified-Booth encoder 100 receives and encodes multiplier bits 23 depicted as array input multiplier bit streams 21, 21'. In addition, new modified-Booth encoder 100 also receives input Y0 as illustrated in FIG. 5. The addition of input Y0 to new modified-Booth encoder 100 results in the generation of a new output signal which is the new carry in signal CO 129. New carry in signal CO 129 is input into a new adder cell 130 described further below.

Figure 1:
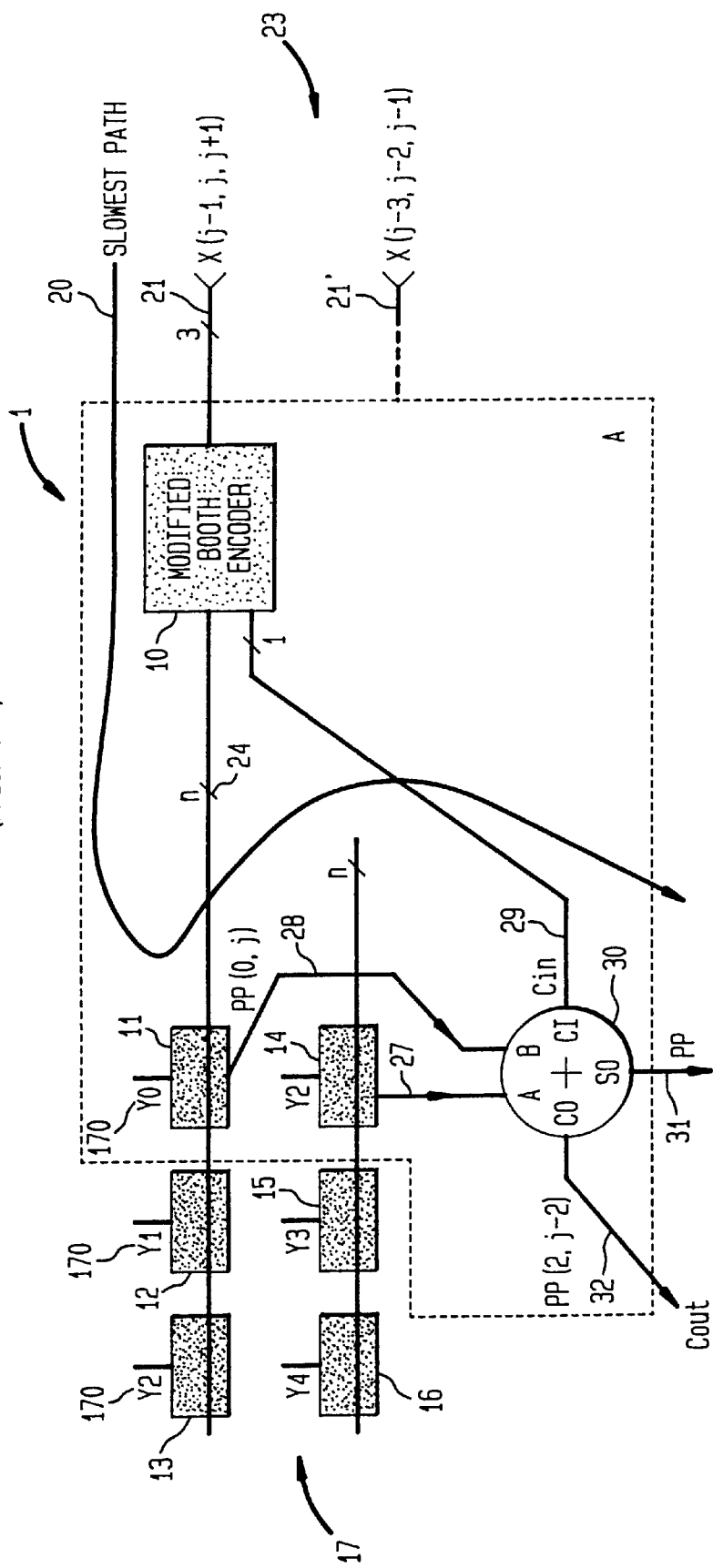
FIG. 1 is a schematic diagram of an implementation of the array in a Modified-Booth multiplier constructed in accordance with the prior art.
Figures 2, 3:
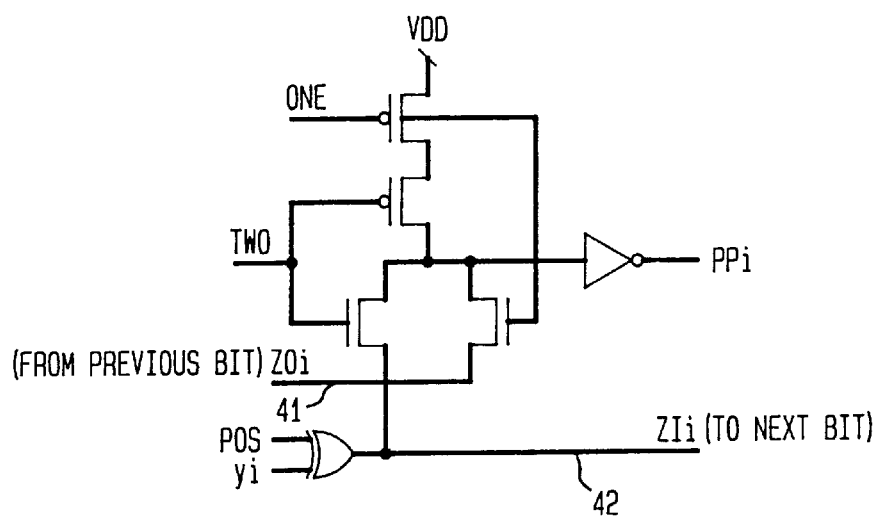
FIG. 2 is a truth table of a Modified-Booth algorithm in accordance with the prior art for n=3 control signals.
FIG. 3 is a digital circuit diagram of a partial product generator constructed in accordance with the prior art.

New modified-Booth encoder 100 sends the encoded multiplier input information 23 to a linear array of partial product generators 117. Input Y0 is also applied to a new partial product generator cell 111. Thus, in the implementation in accordance with the present invention, input Y0 is applied to both new partial product generator cell 111 and new modified-Booth encoder 100. In the prior art, input Y0 was only applied to the $j^{th}$ row, 0 column partial product generator of the array, i.e. first partial product generator 11, as illustrated in FIG. 1. New partial product generator cell 111 also receives new control signals 124 which have been encoded by new modified-Booth encoder 100.

Figure 9:
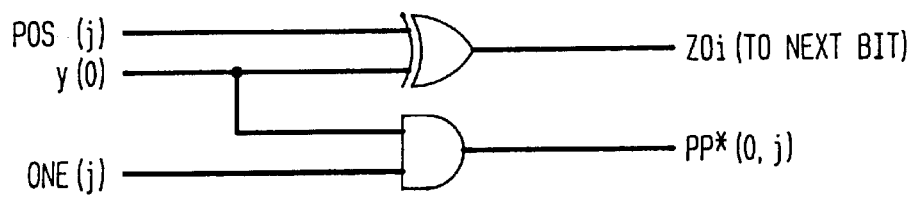
FIG. 9 is a digital circuit diagram of the new partial product generator cell of a Modified-Booth multiplier in accordance with the present invention.

Reference is now made to FIG. 9 which is a digital circuit diagram representation of new partial product generator cell 111. Output $ZO_i$, in FIG. 9, is provided by new partial product generator cell 111 to the next partial product generator in the sequence, in this case, second partial product generator 12. Output PP*(0,j) is the output of new partial product generator cell 111 and can be represented by the following equation:

$$PP^*(0,j) = Y0 \cdot \text{ONE} \qquad (5A)$$

By simplifying equations (1) and (2), it can be shown that:

$$Y0 \cdot ONE = C_{in} \oplus PP_{j,0} \quad (5B)$$

Therefore, by combining equations (5A) and (5B), it can be shown that:

$$PP^*(0,j) = C_{in} \oplus PP_{j,0} = Y0 \cdot ONE \quad (5C)$$

Control signals 124 converted from multiplier bits 21 get applied to the corresponding $j^{th}$ row of new partial product generators 117. Subsequently, the output of the new partial product generator in the first column of the $j^{th}$ row (represented as PP*(0,j) in FIG. 5) 128 is input into new adder cell 130. Additionally, the output of the partial product generator in the third column of the $j-2^{nd}$ row (represented by PP(2,j−2) in FIG. 5) 127 is also input into new adder cell 130. Thus, referring again to FIG. 5, the output 128 of new first partial product generator cell 111 and the output 127 of fourth partial product generator 14 are input into new adder cell 130. Further, new carry in signal CO 129 which is output from new modified-Booth encoder 100 is also input to new adder cell 130 to get a resultant new intermediate partial product PP 131 and a new intermediate carry-out $C_{out}$ 132. This entire operation is depicted inside box A of FIG. 5. Full adder 30 of the prior art, as depicted in FIG. 1, is thus replaced by new adder cell 130 as depicted in FIG. 5. New adder cell 130 has a simplified logic implementation in comparison to full adder 30.

By substituting equation (1) and equation (2) into equation (4), the expression for $C_{out}$ is simplified into the following equation:

$$C_{out} = (\overline{POS} \cdot (\overline{Y0 \cdot ONE})) + \overline{PP}_{j-2,2} \cdot (\overline{POS} + (Y0 \cdot \overline{TWO})) \quad (6)$$

Equation (6) can be simplified to the following format:

$$C_{out} = (PP_{j-2,2} \cdot PP^*_{j,0}) + CO \quad (7)$$

Figure 8:
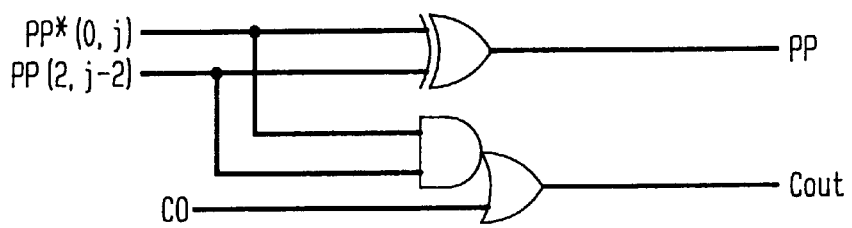
FIG. 8 is a digital circuit diagram of the new adder cell of a Modified-Booth multiplier in accordance with the present invention.

In this equation CO represents new carry in signal 129 generated by new modified-Booth encoder 100. Reference is now made to FIG. 8 which is a digital circuit diagram representation of new adder cell 130 in accordance with the present invention. FIG. 8 is an exemplary electrical schematic of a digital circuit designed to execute the logic represented by equation (7). New adder cell 130 reflects the simplified logic of equation (5C) and (7).

Figure 7:
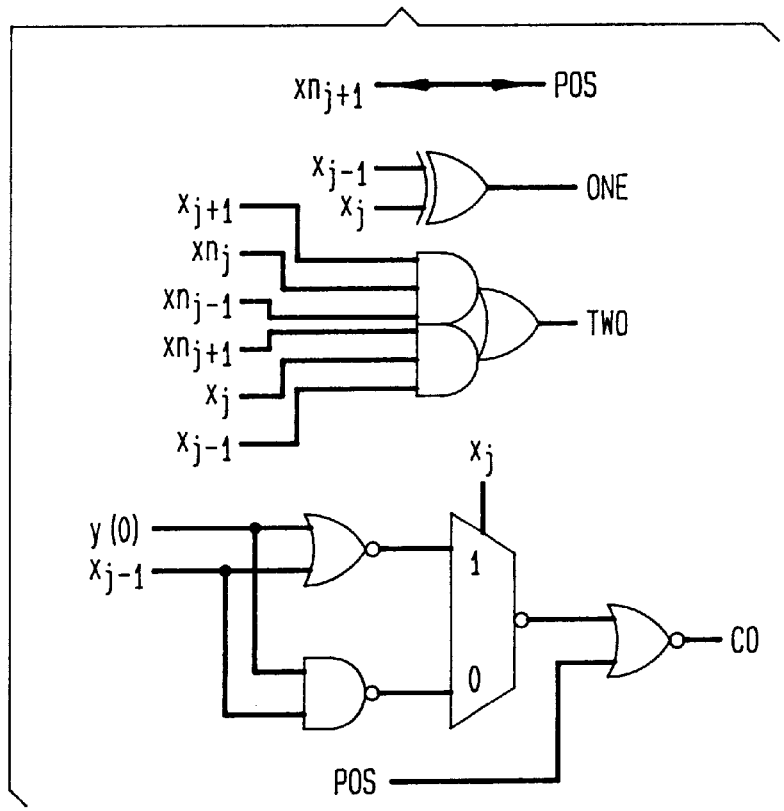
FIG. 7 is a digital circuit diagram of a Modified-Booth algorithm in accordance with the present invention.

Reference is now made to FIG. 6 which depicts the truth table for new modified-Booth encoder 100 constructed in accordance with the present invention. Control signals 124 are represented in FIG. 6 by column headings POS (Positive), TWO and ONE. Reference is now made to FIG. 7 which is an exemplary digital circuit diagram representation of a new modified-Booth algorithm in accordance with the present invention. Outputs POS, ONE, TWO and CO in FIG. 7 correspond to the column headings by the same name in FIG. 6 which is the truth table representation of the digital circuit diagram of FIG. 7. New carry in signal CO 129 which is generated by new modified-Booth encoder 100 is represented in FIG. 6 under the column heading CO. New carry in signal CO 129 can be represented by the following equation which is derived as a function of Y0:

$$CO = \overline{(x_j \cdot (Y0 + x_{j-1}))} + \overline{(x_j \cdot (Y0 \cdot x_{j-1}))} + POS \quad (8)$$

Combining equations (7) and (8) produces a result that is consistent with equation (4). Thus, the output of new modified-Booth multiplier 100 constructed in accordance with the present invention is consistent with the output of modified-Booth multiplier 10 constructed in accordance with the prior art, albeit the prior art device contains none of the advantages of the present invention.

By combining and simplifying new first partial product generator 111 in multiplier array 101 with the corresponding new modified-Booth encoder 100 and new adder cell 130, modified-Booth multiplier array 101 has been optimized. This reduces the number of stages in slowest path 20 as illustrated in FIG. 1. Thus, the overall speed of the modified-Booth multiplier is improved. In the present invention it takes four gate delay stages to receive new carry in signal CO 129 and two more gate delay stages to receive carry out signal $C_{out}$ 132 or intermediate partial product signal PP 131 from new adder cell 130. Thus, it takes a total of six gate delay stages to generate new carry out $C_{out}$ 132 and new intermediate partial product PP 131 with the present invention. This is an improvement of two gate delay stages over the prior art modified-Booth encoded multiplier.

The person of skill, utilizing the teaching of the present invention, will recognize that there are alternate ways to carry out the logic described herein, for example by modifying the logic circuitry, either discrete or integrated or some combination thereof, or carrying out the logic in software or firmware in a computer device, such as, by way of non-limiting example, a microprocessor, a general purpose computer, an application specific integrated circuit and the like.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A multiplier comprising:

an array of partial product generators for receiving multiplicand inputs Y0 . . . YN, the Y0 receiving partial product generator being a new partial product generator for generating a partial product PP*(0,j) represented by the equation:

$$PP^*(0,j) = Y0 \cdot ONE;$$

and at least one new modified-Booth encoder for receiving array input Y0 and for receiving and encoding multiplier bits and generating a control signal and a carry in signal (CO) represented by the equation:

$$CO = \overline{(x_j \cdot (Y0 + x_{j-1}))} + \overline{(x_j \cdot (Y0 \cdot x_{j-1}))} + POS;$$

said array of partial product generators including a new adder cell for each corresponding new modified-Booth encoder, said new adder cell connected to said encoder, the new partial product generator cell and a partial product generator cell receiving multiplicand input Y2, for generating a partial product PP represented by the equation:

$$PP = PP^*(0,j) \oplus PP(2,j-2)$$

and for generating an intermediate carry out signal ($C_{out}$) represented by the equation:

$$C_{out}=(PP_{j-2,2} \cdot PP^*_{j,0})+CO$$

where CO represents said carry in signal, $PP_{j-2,2}$ represents the output of the Y2 receiving partial product generator cell, and $PP^*_{j,0}$ represents the output of said new partial product generator cell so as to reduce the number of gate delay stages in the critical path of said multiplier.

2. The multiplier of claim 1, wherein the total number of gate delay stages to generate new carry out $C_{out}$ and new intermediate partial product PP is reduced by two gate delay stages.

3. The multiplier of claim 1, wherein said multiplier bits comprise three bits of information.

4. The multiplier of claim 1, wherein it takes four gate delay stages for said new adder cell to receive said carry in signal from said new modified-Booth encoder.

5. The multiplier of claim 1, wherein it takes two gate delay stages for said new adder cell to generate said carry out signal.

6. The multiplier of claim 1, wherein the total number of gate delay stages to generate new carry out $C_{out}$ and new intermediate partial product PP is less than 8.

7. The multiplier of claim 1, wherein the total number of gate delay stages to generate new carry out $C_{out}$ and new intermediate partial product PP is 6.

8. The multiplier of claim 1, wherein the total number of gate delay stages to generate new carry out $C_{out}$ and new intermediate partial product PP is less than or equal to 6.

9. The multiplier of claim 1, wherein said multiplier is formed as part of an integrated circuit.

10. A method of reducing the number of gate delay stages in the critical path of a multiplier comprising the steps of:
   receiving and encoding multiplier bits and multiplicand input Y0 within a new modified-Booth encoder;
   generating control signals and a carry in output signal (CO) from said new modified-Booth encoder, said carry in output signal represented by the equation:

$$CO=\overline{(x_j \cdot (Y0+x_{j-1}))+(\overline{X_j} \cdot (Y0 \cdot x_{j-1}))+POS};$$

feeding said control signals to a new first partial product generator cell and a Y2 receiving partial product generator cell;
   generating a partial product $PP^*(0,j)$ from said new first partial product generator cell, said partial product represented by the equation:

$$PP^*(0,j)=Y0 \cdot ONE;$$

generating a partial product $PP(2,j-2)$ from said Y2 receiving partial product generator cell;
   feeding the output of said new first partial product generator cell, said Y2 receiving partial product generator cell and said carry in signal to a new adder cell; and
   generating a carry out signal ($C_{out}$) and an intermediate partial product signal (PP) from said new adder cell, said carry out signal represented by the equation:

$$C_{out}=(PP_{j-2,2} \cdot PP^*_{j,0})+CO$$

and said intermediate partial product signal represented by the equation:

$$PP=PP^*(0,j) \oplus PP(2,j-2).$$

11. The method of claim 10, wherein the total number of gate delay stages to generate new carry out $C_{out}$ and new intermediate partial product PP is reduced by two gate delay stages.

12. The method of claim 10, wherein it takes six gate delay stages for said new adder cell to receive said carry in signal from said new modified-Booth encoder and generate said carry out signal and said intermediate partial product signal.

13. The method of claim 10, wherein it takes four gate delay stages for said new adder cell to receive said carry in signal from said new modified-Booth encoder.

14. The method of claim 10, wherein it takes two gate delay stages for said new adder cell to generate said carry out signal and said intermediate partial product signal.

15. The method of claim 10, wherein the total number of gate delay stages to generate new carry out $C_{out}$ and new intermediate partial product PP is less than 8.

16. The method of claim 10, wherein the total number of gate delay stages to generate new carry out $C_{out}$ and new intermediate partial product PP is less than or equal to 6.

17. The method of claim 10, wherein said steps are carried out by software executing on a computer device.

18. A multiplier comprising:
   an array of partial product generators for receiving inputs Y0 . . . YN, the Y0 receiving partial product generator being a new partial product generator for generating a partial product $PP^*(0,j)$; and
   at least one new modified-Booth encoder for receiving array input Y0 and for receiving and encoding multiplier bits and generating a control signal and a carry in signal (CO);
   said array of partial product generators including a new adder cell for each corresponding new modified-Booth encoder, said new adder cell connected to said encoder and the Y0 receiving partial product generator, for generating a partial product PP and an intermediate carry out signal ($C_{out}$) so as to reduce the number of gate delay stages in the critical path of said multiplier.

19. The multiplier of claim 18, wherein said multiplier is formed as part of an integrated circuit.

20. An integrated circuit including a multiplier comprising:
   an array of partial product generators for receiving multiplicand inputs Y0 . . . YN, the Y0 receiving partial product generator being a new partial product generator for generating a partial product $PP^*(0,j)$ represented by the equation:

$$PP^*(0,j)=Y0 \cdot ONE;$$

and
   at least one new modified-Booth encoder for receiving array input Y0 and for receiving and encoding multiplier bits and generating a control signal and a carry in signal (CO) represented by the equation:

$$CO=\overline{(x_j \cdot (Y0+x_{j-1}))+(\overline{x_j} \cdot (Y0 \cdot x_{j-1}))+POS};$$

said array of partial product generators including a new adder cell for each corresponding new modified-Booth encoder, said new adder cell connected to said encoder, the new partial product generator cell and a partial product generator cell receiving multiplicand input Y2, for generating a partial product PP represented by the equation:

$$PP = PP^*(0,j) \oplus PP(2,j-2)$$

and for generating an intermediate carry out signal ($C_{out}$) represented by the equation:

$$C_{out} = (PP_{j-2,2} \cdot PP^*_{j,0}) + CO$$

where CO represents said carry in signal, $PP_{j-2,2}$ represents the output of the Y2 receiving partial product generator cell, and $PP^*_{j,0}$ represents the output of said new partial product generator cell so as to reduce the number of gate delay stages in the critical path of said multiplier.

21. The integrated circuit of claim 20, wherein the total number of gate delay stages to generate new carry out $C_{out}$ and new intermediate partial product PP is reduced by two gate delay stages.

22. The integrated circuit of claim 20, wherein said multiplier bits comprise three bits of information.

23. The integrated circuit of claim 20, wherein it takes four gate delay stages for said new adder cell to receive said carry in signal from said new modified-Booth encoder.

24. The integrated circuit of claim 20, wherein it takes two gate delay stages for said new adder cell to generate said carry out signal.

25. The integrated circuit of claim 20, wherein the total number of gate delay stages to generate new carry out $C_{out}$ and new intermediate partial product PP is less than 8.

26. The integrated circuit of claim 20, wherein the total number of gate delay stages to generate new carry out $C_{out}$ and new intermediate partial product PP is 6.

27. The integrated circuit of claim 20, wherein the total number of gate delay stages to generate new carry out $C_{out}$ and new intermediate partial product PP is less than or equal to 6.

28. A method of improving a multiplier comprising a Modified-Booth Encoder comprising:

identifying a critical path of said multiplier;

determining a number of gate delay stages present in said critical path; and reducing said number of gate delay stages by two gate delay stages.

* * * * *